United States Patent [19]

Hansen

[11] Patent Number: 4,915,071
[45] Date of Patent: * Apr. 10, 1990

[54] ORBIT INTERNAL COMBUSTION ENGINE

[75] Inventor: Craig N. Hansen, Minnetonka, Minn.

[73] Assignee: Hasen Engine Corporation, Minnetonka, Minn.

[*] Notice: The portion of the term of this patent subsequent to Sep. 8, 2004 has been disclaimed.

[21] Appl. No.: 253,973

[22] Filed: Oct. 5, 1988

Related U.S. Application Data

[63] Continuation of Ser. No. 93,884, Sep. 8, 1987, abandoned.

[51] Int. Cl.$^4$ ............................................. F02B 53/00
[52] U.S. Cl. ................................... 423/242; 418/61.1
[58] Field of Search .............. 123/242, 243; 418/61 R

[56] References Cited

U.S. PATENT DOCUMENTS

| | | |
|---|---|---|
| 879,313 | 2/1903 | Tew . |
| 1,242,692 | 10/1917 | Hibner . |
| 1,424,977 | 8/1922 | Bidwell . |
| 2,345,561 | 4/1944 | Allen, Jr. . |
| 2,423,507 | 7/1947 | Lawton . |
| 3,196,856 | 7/1965 | Ward . |
| 3,221,664 | 12/1965 | Jernaes . |
| 3,260,135 | 7/1966 | Eisenhardt . |
| 3,260,247 | 7/1977 | Gassmann et al. . |
| 3,572,030 | 3/1971 | Cuff . |
| 3,743,451 | 7/1973 | Chapman . |
| 3,771,501 | 11/1973 | DeDobo . |
| 3,787,150 | 1/1974 | Sarich . |
| 3,875,905 | 4/1975 | Duquette . |
| 3,938,916 | 2/1976 | Sarich . |
| 3,964,442 | 6/1976 | Hunter . |
| 4,018,191 | 4/1977 | Lloyd . |
| 4,021,160 | 5/1977 | Todorovic . |
| 4,079,083 | 3/1978 | Sarich . |
| 4,192,348 | 3/1980 | Hansen . |
| 4,219,315 | 8/1980 | Sarich . |
| 4,299,097 | 11/1981 | Shank et al. . |
| 4,449,490 | 5/1984 | Hansen . |
| 4,494,500 | 1/1985 | Hansen . |
| 4,507,067 | 3/1985 | Hansen . |
| 4,612,886 | 9/1986 | Hansen et al. . |
| 4,618,318 | 10/1986 | Hansen . |
| 4,662,329 | 5/1987 | Roggenburk . |
| 4,667,468 | 5/1987 | Hansen . |
| 4,692,104 | 9/1987 | Hansen . |
| 4,773,364 | 9/1988 | Hansen et al. . |
| 4,782,656 | 11/1988 | Hansen . |

FOREIGN PATENT DOCUMENTS 2059416 8/1971 Fed. Rep. of Germany .

Primary Examiner—Michael Koczo
Attorney, Agent, or Firm—Burd, Bartz & Gutenkauf

[57] ABSTRACT

An orbit internal combustion engine having a housing with a cylindrical internal wall surrounding a plurality of combustion chambers. A plurality of pairs of intake and exhaust valves mounted on the housing control the flow of an air and fuel mixture into and exhaust gases out of the combustion chambers. A piston mounted on the shaft has a primary eccentric that supports the piston in the combustion chambers. A pair of secondary eccentrics spaced from the primary eccentric are mounted on the piston and housing to control the orbital movement of the piston. Seal assemblies slidably mounted in slots in the piston engage the cylindrical internal wall of the housing to form separate combustion chambers. The housing has arcuate slots non-concentric with its cylindrical internal wall accommodating axles on the seal assemblies to maintain the seal assemblies in constant and substantially uniform sealing engagement with the internal wall of the housing.

22 Claims, 8 Drawing Sheets

ORBIT INTERNAL COMBUSTION ENGINE

This is a continuation of application Ser. No. 093,884 filed September 8, 1987, abandoned.

FIELD OF INVENTION

The invention relates to internal combustion engines having combustion chambers separated from each other with seal assemblies. The engine has a non-rotating piston for rotating a shaft.

BACKGROUND OF INVENTION

Rotary internal combustion engines have housings that include chambers that accommodate rotating pistons. An example of this type of engines is disclosed by Lloyd in U.S. Pat. No. 4,018,191. It is conventional practice to utilize springs to continuously bias the vanes of a rotary engine into engagement with surfaces, such as the inside wall of housings forming the combustion chambers of the engine. Examples of spring biased vanes associated with rotors are shown in U.S. Pat. Nos. 1,242,692; 1,424,977; and 3,572,030. These types of rotary engines have limited operating speeds. Centrifugal forces cause the vanes to move into frictional contact with the inside walls of the housing. This frictional contact causes considerable wear resulting in gas leakage past the vanes and excessive mechanical losses.

Rotary vane-type devices have been used to positively position the vanes during the rotation of the rotors relative to the housings of the devices. The positive positioning of the vanes is achieved through rollers located in continuous cam tracks. Shank et al shows in U.S. Pat. No. 4,299,097, a vane-type rotary device having a rotor with a plurality of vanes. Rollers located in tracks positively control the location of the vanes during the rotation of the rotor. Hansen in U.S. Pat. No. 4,667,468 discloses a rotary internal combustion engine having a plurality of vane and seal assemblies located in sliding sealing engagement with the inside surface of the housing of the engine. The rotary device has positive control of both the rotor and housing vane and seal assemblies to provide effective sliding gas seals between the stationary housing and the rotating rotor.

Air compressors having pistons which have controlled movement through eccentrics are shown by Lawton in U.S. Pat. No. 2,423,507 and Jerneas in U.S. Pat. No. 3,221,664. These air compressors have sealed structures interposed between the movable and stationary parts to reduce leakage and enhance compressor efficiency. The engaging parts are subject to high sliding speeds which may result in wear and considerable friction which limit the efficiency and useful life of the compressors.

SUMMARY OF INVENTION

The invention is directed to an internal combustion engine which utilizes hydrocarbon fuel, such as gasoline, alcohol and the like in an economical and efficient manner. The internal combustion engine has a housing having an inner cylindrical wall surrounding a plurality of combustion chambers. A combustible air and fuel mixture is introduced into the combustion chambers through intake valves associated with each combustion chamber. The housing also supports a plurality of exhaust valves operable to allow exhaust gases to evacuate from the combustion chambers to the atmosphere via mufflers and catalytic converters. The valves are operated in timed relation relative to rotation of the shaft in accordance with the cycles of the internal combustion chambers. A piston having an outer surface in each combustion chamber is surrounded by the housing and supported on a shaft. The shaft has a primary eccentric rotatably supporting the piston. Secondary eccentrics are rotatably mounted on the housing and piston to control the orbit movement of the piston and limit the piston angular displacement. A plurality of seal assemblies arranged around the piston separate each combustion chamber whereby movement of the piston relative to the combustion chambers provides each combustion chamber with an intake stroke, compression stroke, power stroke, and exhaust stroke. During orbit movement of the piston, the seal assemblies have limited arcuate movement relative to the inner wall of the housing. The piston has a generally radial movement relative to the seal assemblies. Each seal assembly and housing has a cooperating structures allowing limited arcuate movement of the seal assembly and restricted radial movement thereof during movement of the piston. The seal assemblies are in continuous and constant sealing engagement with the inner wall of the housing. The seal members of the seal assemblies that engage the inner cylindrical wall of the housing are in relatively low sealing frictional engagement and have low sliding speeds as compared to other seals in constant displacement devices. Fuel ignitors, such as sparkplugs, mounted on the housing are in communication with each combustion chamber. The ignitors are operable to ignite the compressed fuel in the combustion chambers and thereby cause the piston to have orbital movement and rotate the shaft.

The preferred embodiment of the internal combustion engine has a housing with a cylindrical inside wall that surrounds the plurality of combustion chambers. A piston having an outer cylindrical face is surrounded by the housing. The diameter of the piston is less than diameter of the inner cylindrical wall of the housing. A shaft having a primary eccentric is rotatably mounted on the housing. The piston is rotatably mounted on the primary eccentric such that on orbit movement of the piston the shaft is rotated. Additional eccentrics rotatably cooperate with the primary eccentric to limit the angular movement of the piston during the rotation of the shaft. The additional eccentrics are rotatably mounted on the housing and extend through the piston radially outwardly from the primary eccentric. The additional eccentrics are circumferentially spaced from each other. A plurality of seal assemblies are arranged around the piston to provide separate combustion chambers and locate the seal assemblies between pairs of intake and exhaust valves that operate to control the flow of fuel into the combustion chambers and exhaust gases out of the combustion chambers. Intake and exhaust valves for each combustion chamber and fuel ignitor are mounted on the housing for each combustion chamber. The valves are operated in timed relation relative to rotation of the shaft in accordance with the four cycles of the internal combustion engine for each combustion chamber. The seal assemblies have blade means associated with the housing to permit arcuate movement of the blade means and restrict radial movement thereof during orbital movement of the piston. Each seal assembly has a blade located in a generally radial slot in the piston. The slots are circumferentially spaced about the piston. The circumferential distance between adjacent seal assemblies can be equal or varied to provide selected working volumes or combustion chambers for the engine. Each blade has an outer end with a transverse groove which accommodates a seal member. The seal member is located in an even and continuous sliding sealing engagement with the inner cylindrical wall of the housing. This engagement is maintained with a cross bar attached to each blade. The cross bar has outer ends supporting rollers that are located in arcuate slots in the end plates of the housing to anchor the blade on the housing. The arcuate slots cooperate with the rollers of the cross bars to allow the blade to have limited arcuate movement and restricted radial movement with respect to the housing. This ensures uniform and constant sealing contact between the seal member and the inner cylindrical wall of the housing. The seal member has relatively low sealing frictional engagement with the inner cylindrical wall of the housing and relatively low sliding speeds as compared to other constant displacement devices. The retaining of the blade on the housing minimizes the centrifugal force on the seal member and blade and thereby reduces sealing friction. This results in an effective seal assembly having a long useful wear life.

These and other advantages of the internal combustion engine of the invention are shown in the drawings and described in the following detailed description.

DESCRIPTION OF PREFERRED EMBODIMENT

Figure 1:
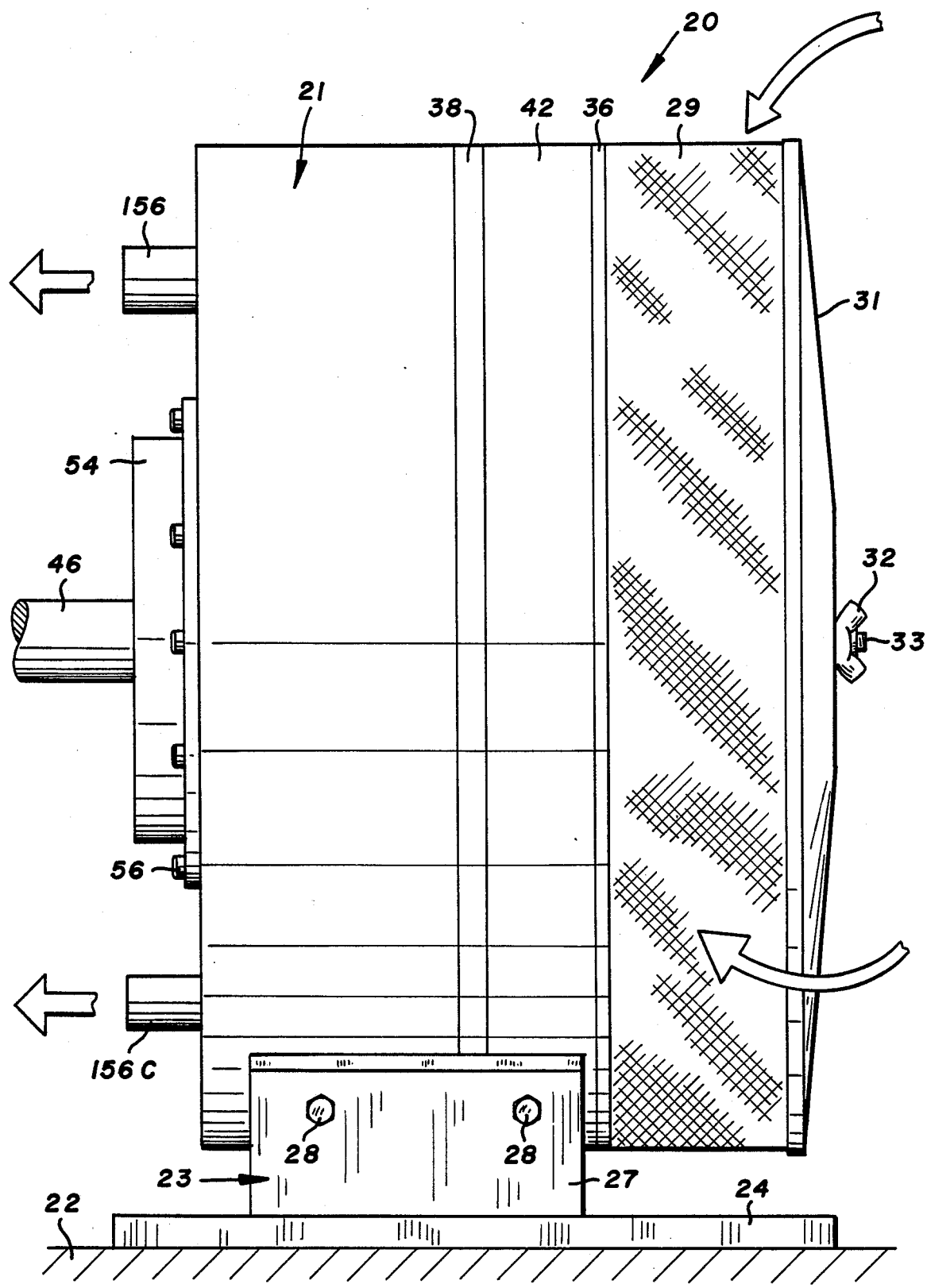
FIG. 1 is a side elevational view of the internal combustion engine of the invention.
Figure 2:
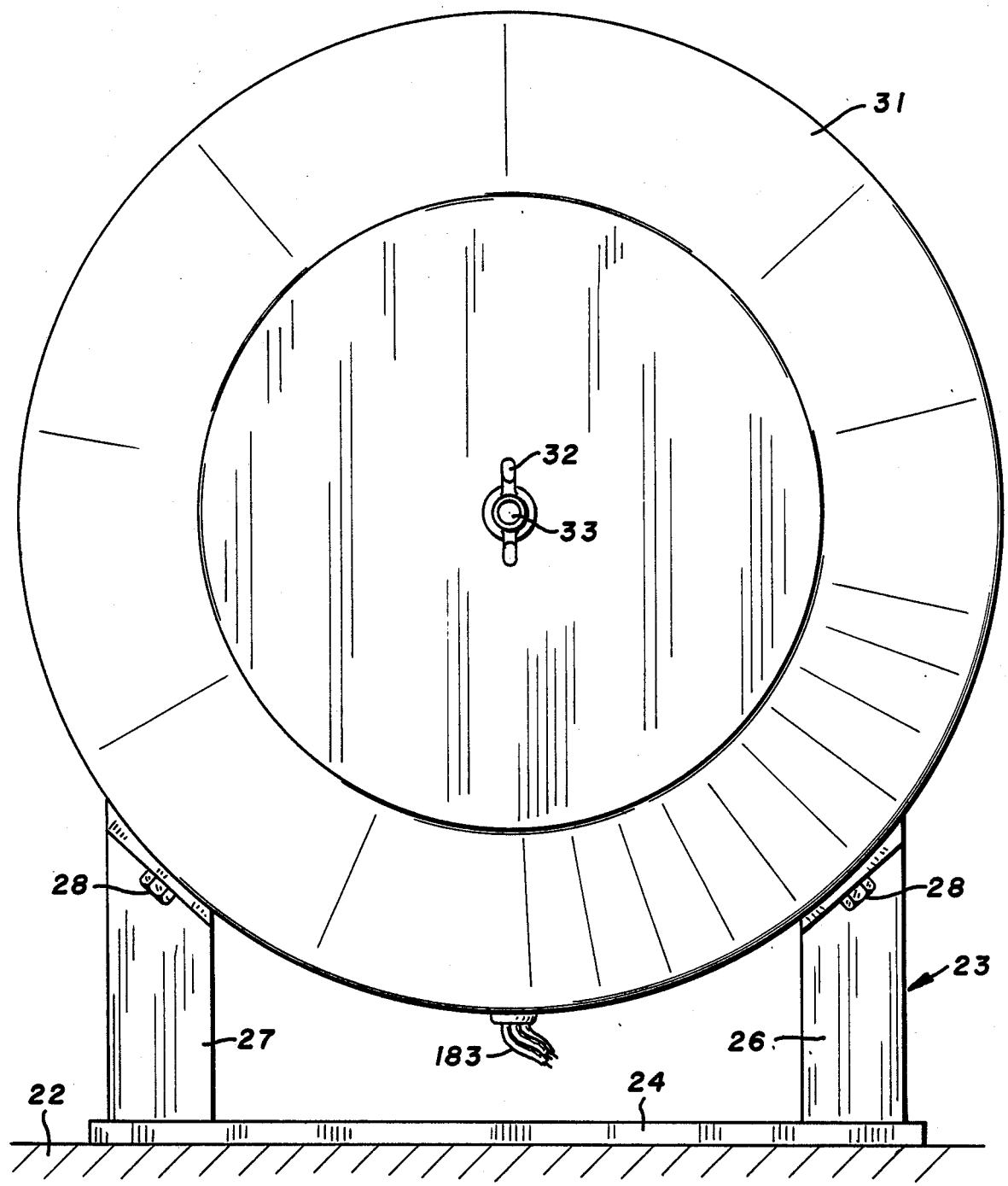
FIG. 2 is an end view of the air intake end of the engine of FIG. 1.
Figure 3:
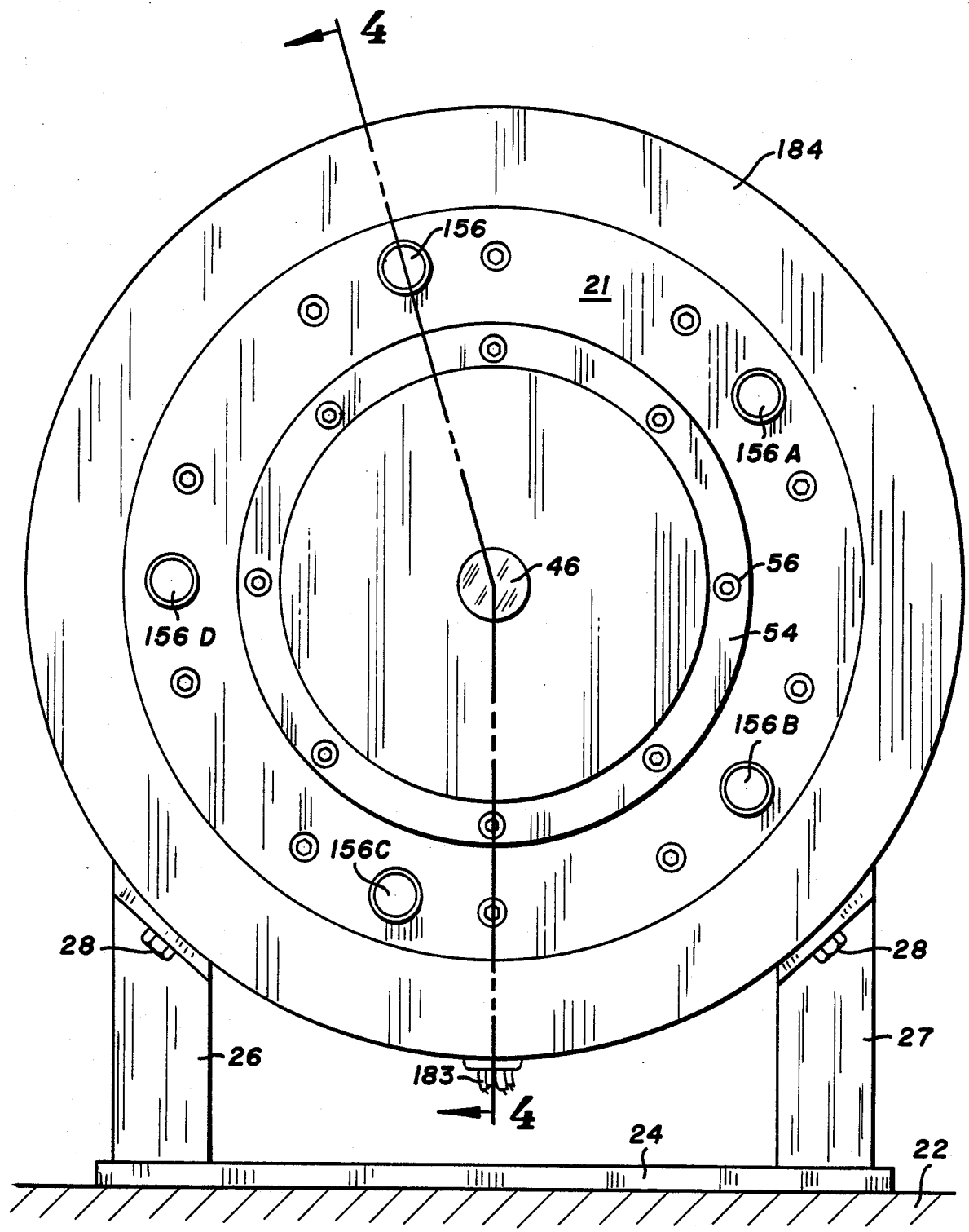
FIG. 3 is an end view of the exhaust gas end of the engine of FIG. 1.

Referring to FIGS. 1 to 3, there is shown an internal combustion engine of the invention, indicated generally at 20, operable with combustible fuels including gases and liquid-air mixtures, such as propane gas, gasoline, alcohol, and like hydrocarbon fuels. Engine 20 has a housing 21 positioned on a support 22 with a frame indicated generally at 23. Frame 23 has a generally flat base plate 24 adapted to be secured to support 22. A pair of upwardly directed arms 26 and 27 secured to base plate 24 are attached to opposite lower portions of housing 21 with suitable fasteners, such as bolts 28. Other means including shock absorbing pads and bolts can be used to secure housing 21 to arms 26 and 27.

An annular air filter 29 is located adjacent the inlet end of housing 21. The outer end of air filter 29 engages a circular cover 31. A wing nut 32 threaded onto a bolt or threaded rod 33 engages the center of cover 21 to hold cover 31 and air filter 29 in engagement with a plate 36. Bolt 33 has a head 34 that is secured by welds or the like to the center of plate 36. Annular air filter 29, cover 31, and plate 36 form an air chamber 37 for air to be drawn into the internal combustion engine. Air filter 29 is a conventional automotive air filter having a diameter that engages the outer peripheral portion of plate 36. Filter 29 can be removed from engine 20 by turning wing nut 32 off bolt 33 and removing cover 21 from the filter. A clean filter can then be placed on plate 36 and retained in position with cover 21 and wing nut 32 as shown in FIGS. 1, 2, and 4.

Figure 4:
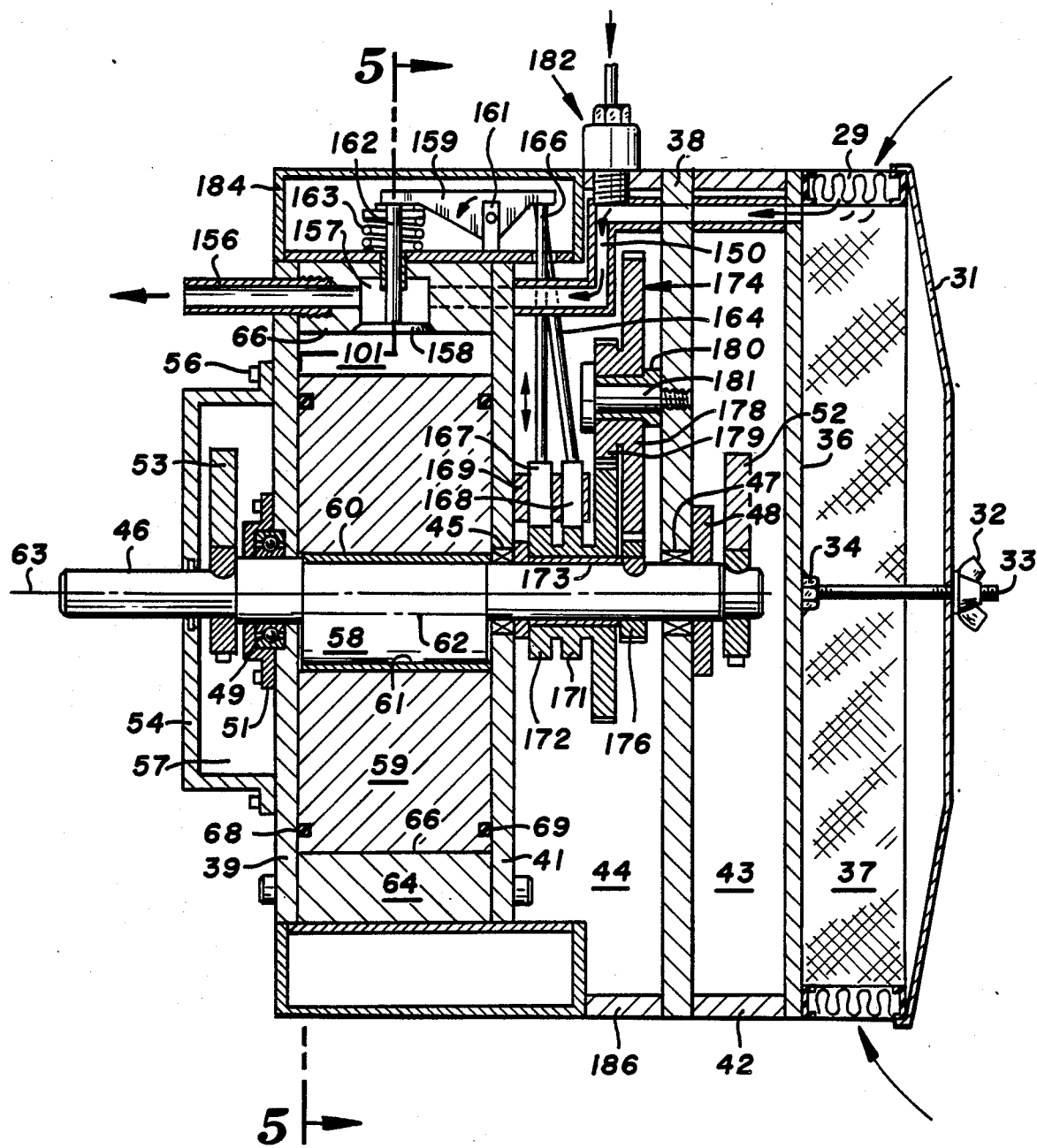
FIG. 4 is a sectional view on a reduced scale taken along the line 4—4 of FIG. 3.

As shown in FIG. 4, housing 21 has an inlet end plate 38 and an oulet end plate 39. A third or middle plate 41 is interposed between plates 38 and 39. A first annular member or ring 42 located between plates 36 and 38 provides a first chamber 43. A second chamber 44 is located between plates 38 and 41.

Figure 5:
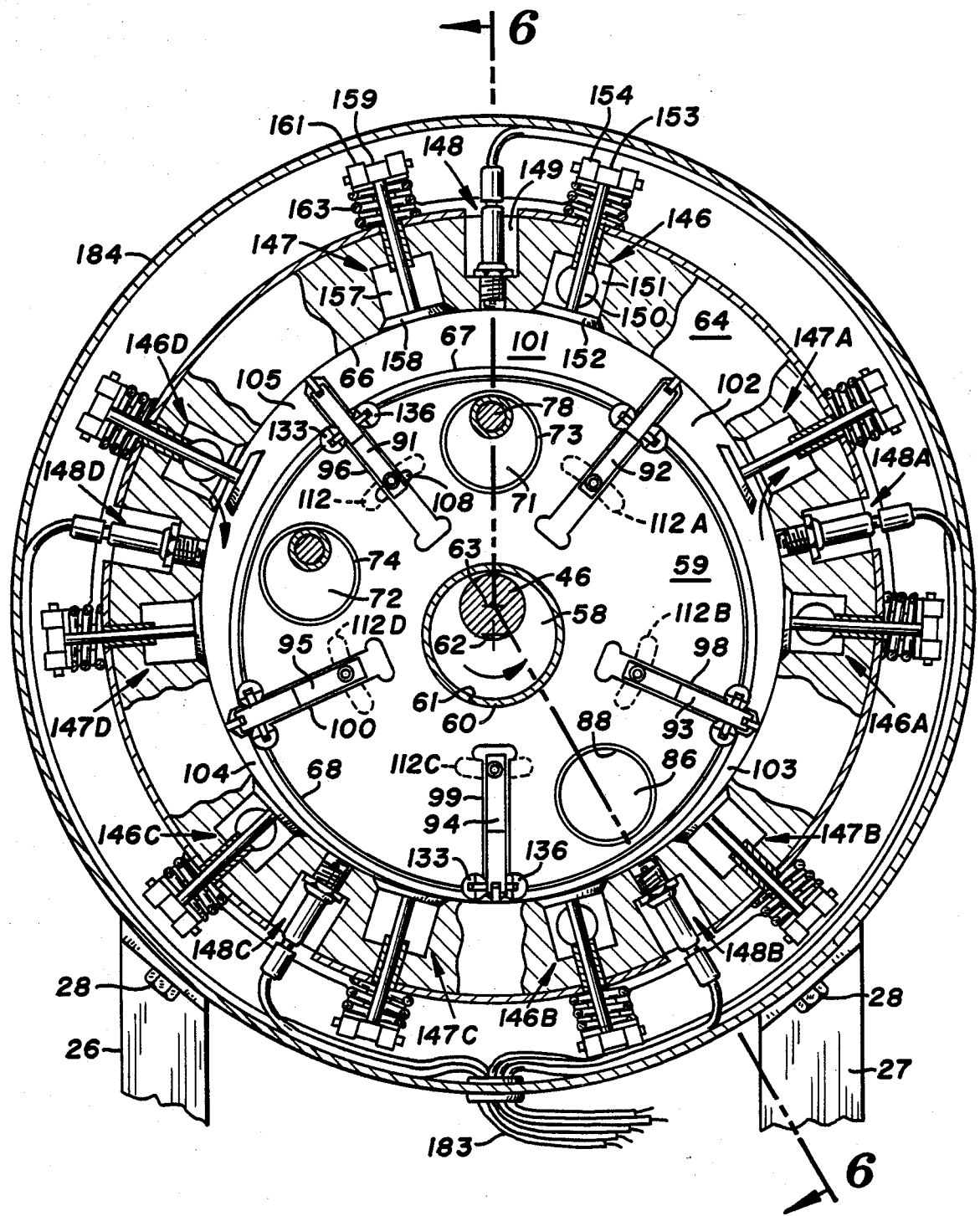
FIG. 5 is an enlarged sectional view taken along the line 5—5 of FIG. 4.

A generally horizontal shaft 46 is rotatably mounted on plates 38 and 39 with bearings 47 and 49. A seal 48 attached to plate 38 surrounds shaft 46 adjacent bearing 47. A retainer 51 located about shaft 46 holds bearing 49 in assembled relation with plate 39. Shaft 46 carries a pair of counterweights 52 and 53 adjacent its opposite outer ends to dynamically balance shaft 46 and piston 59. Counterweight 52 is located in chamber 43. Counterweight 53 is located within a space 57 formed by a cover 54 secured to end plate 39 with a plurality of bolts 56. Shaft 46 has an eccentric 58 that is located between the plates 39 and 41. A cylindrical piston or orbitor 59 is rotatably mounted on eccentric 58. As shown in FIG. 5, piston 59 has a bore 61 accommodating an annular bearing 60 surrounding eccentric 58. Bearing 60 can be a sleeve, needle, or roller bearing to allow piston 59 to have angular movement relative to eccentric 58. Bore 61 has an axis 62 that coincides with the axis of eccentric 58. Axis 62 is offset from the longitudinal rotational axis 63 of shaft 46. An annular housing or casing 64 located between plates 39 and 41 surrounds piston 59. Suitable nut and bolt assemblies or like fasteners (not shown) secure plates 39 and 41 to opposite sides of casing 64. Casing 64 has a cylindrical inner wall 66 having a radius centered on axis 63. The diameter of cylindrical wall 66 is larger than the diameter of piston 59. Piston 59 is a circular metal disk having a cylindrical outer peripheral surface or face 67 that is centered on eccentric axis 62. Surface 67 of piston 59 and cylindrical inner wall 66 are shown circular but need not be and are machined with conventional machine tools.

Figure 6:
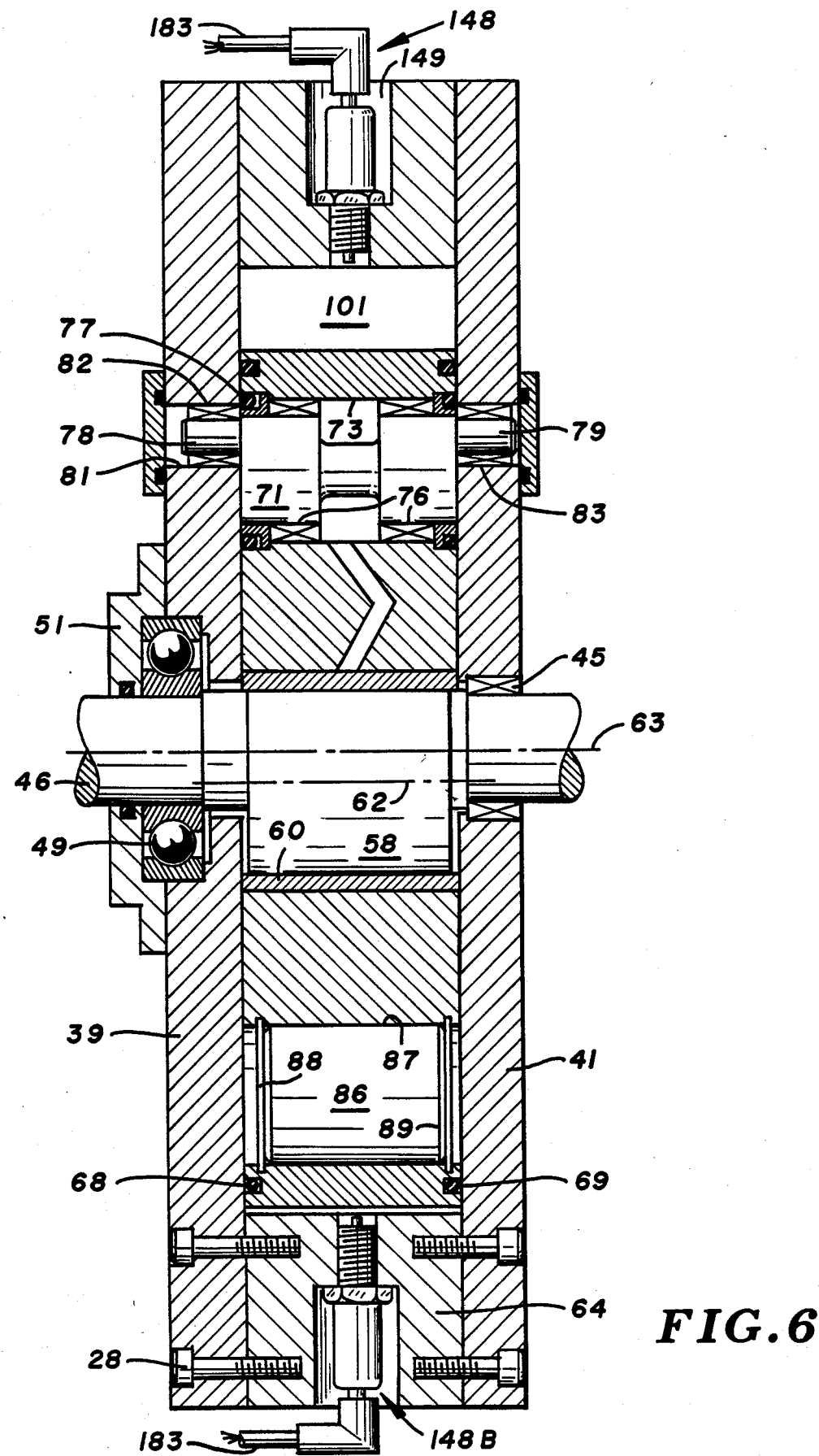
FIG. 6 is a sectional view taken along the line 6—6 of FIG. 5.

Referring to FIGS. 5 and 6, a plurality of arcuate segment seals 68 and 69 extend along the outer peripheral edge of piston 59 on the opposite sides thereof. Piston 59 is also mounted on a pair of eccentrics 71 and 72 located radially outward from eccentric 58. Eccentrics 71 and 72, shown in FIG. 5, are circumferentially spaced from each other to control the orbital movement of piston 59. Eccentrics 71 and 72 are angularly spaced from each other about 70 degrees. Eccentrics 71 and 72 are located in transverse bores 73 and 74 in piston 59. The eccentrics 71 and 72 are identical in structure. The following description is limited to eccentric 71.

As shown in FIG. 6, eccentric 71 has a pair of eccentric hubs or portions rotatably mounted in bore 73 with a plurality of bearings 76. The eccentric 71 has outwardly directed ends or stub shafts 78 and 79 offset from the axis of the eccentric that extend into holes 81 and 83 in plates 39 and 41 respectively. Bearings 82 and 84 are rotatably disposed on stub shaft 78 and 79 to freely rotate eccentric 71 on plates 39 and 41. An annular seal 77 is disposed about opposite ends of eccentric 71 adjacent bearing 76.

As shown in FIGS. 5 and 6, a cylindrical counterweight 86 is located in a bore 87 in piston 59 to compensate for the mass of eccentrics 71 and 72. Counterweight 86 is located generally opposite eccentrics 71 and 72. A pair of snap rings 88 and 89 retain counterweight 86 in bore 87 in piston 59.

Piston 59 is movably associated with a plurality of radial seal assemblies 91, 92, 93, 94, and 95. Each of the seal assemblies 91-95 are disposed within radial slots, 96, 97, 98, 99, and 100 in piston 59. The slots extend in a radial direction from the shaft axis 63 and are open to the outer peripheral surface 67 of piston 59. The seal assemblies 91-95 divide the internal space of the engine into five separate combustion chambers 101, 102, 103, 104, and 105. The number of seal assemblies can vary thereby change the number of combustion chambers. Each seal assembly has moving and sealing components, hereinafter described, that have low sliding speeds and low sealing friction which improves compression and combustion efficiency and wear life thereof.

Figure 7:
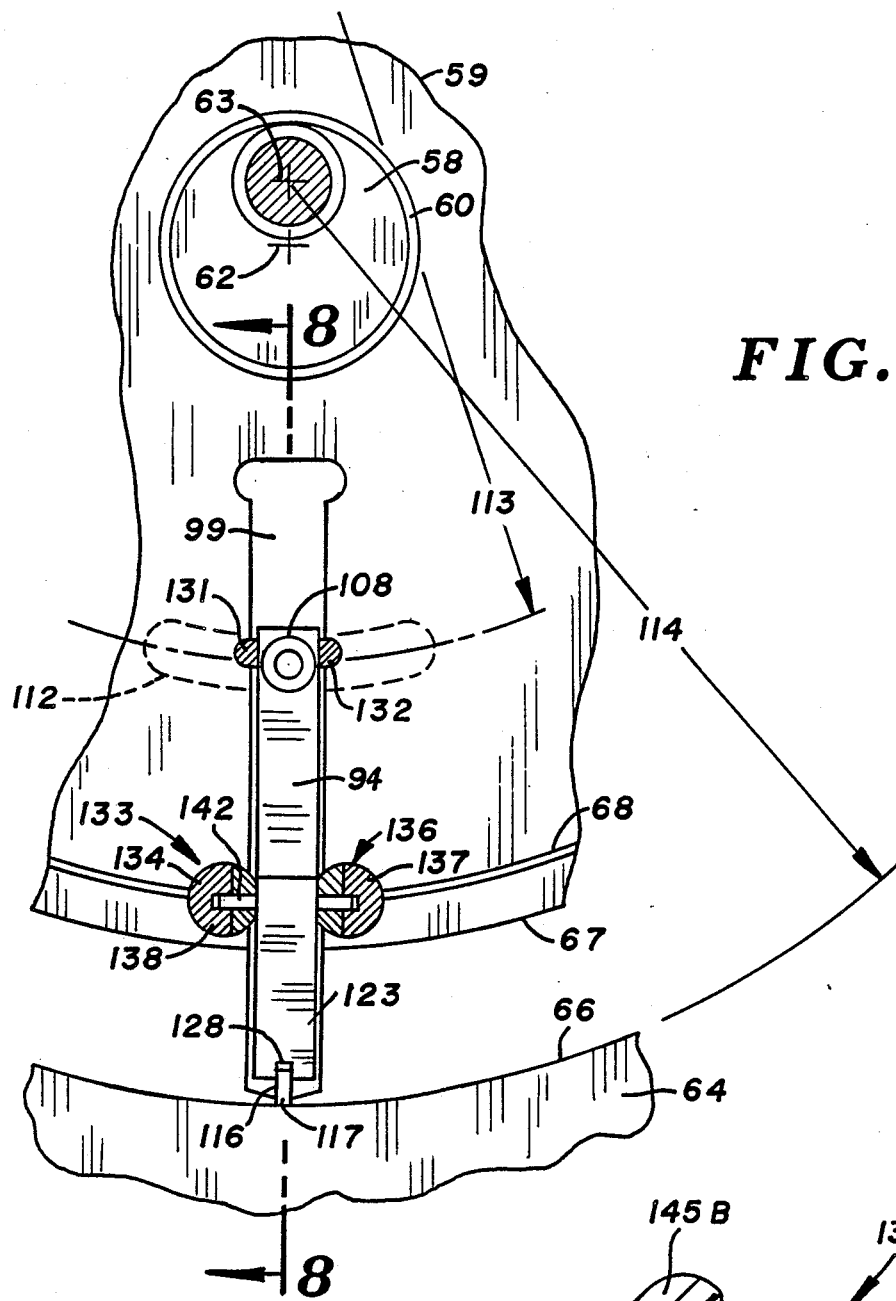
FIG. 7 is an enlarged end view of one seal assembly associated with the piston of the engine of FIG. 1.
Figure 8:
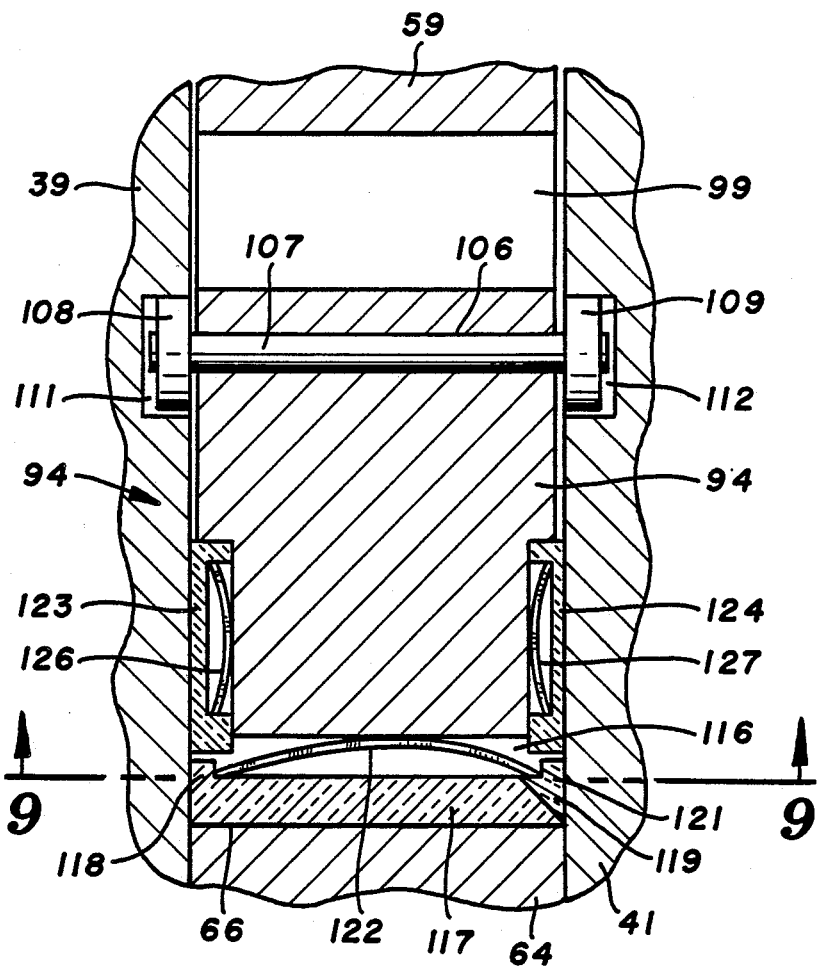
FIG. 8 is an enlarged sectional view taken along line 8—8 of FIG. 7.
Figure 9:
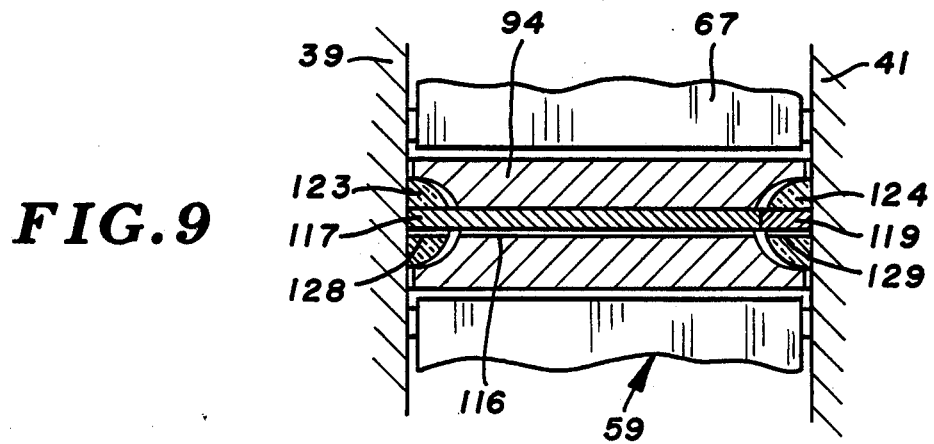
FIG. 9 is an enlarged sectional view taken along line 9—9 of FIG. 7.

The following description is directed to seal assembly 94 as shown in FIGS. 7, 8, and 9. Seal assemblies 91, 92, 93 and 95 are identical in structure and function as seal assembly 94. Seal assembly 94 has a generally flat body 94A having a transverse hole 106 in the inner end thereof. A cylindrical cross rod 107 extends through hole 106. Rollers 108 and 109 are rotatably mounted on opposite ends on cross rod 107. Roller 108 is located in a arcuate slot 111 in plate 39. Roller 108 is located in an arcuate slot 112 in plate 41. The slots 111 and 112 are in the inside surfaces of plates 39 and 41 and have substantially the same length radii 113 as the radial distance 114 between inner surface 66 of casing 64 and axis 63. The arcuate curvatures of grooves or slots 111 and 112 need not be concentric with the arcuate curvature of inner wall 66 of casing 64. Rollers 108 and 109 functions as cam followers that follow the arcuate curvature or track of slots 111 and 112 to ensure constant, continuous and even sliding sealing engagement of seal assembly 94 with the inner cylindrical wall 66 of casing 64 and the inside surfaces of plates 39 and 41. Plates 39 and 41 have additional arcuate slots 111 A-D and 112 A-D for the seal assemblies 92-95 that have the same structure and function as slots 111 and 112.

The outer end of the body of seal assembly 94 is chamfered and has a transverse groove 116 accommodating a generally flat or blade seal member 117. Member 117 has an inwardly directed shoulder, as shown in FIG. 8, at one end thereof. A generally triangular edge seal 119 is located at the opposite end of member 117. Edge seal 119 has an inwardly directed shoulder 121. Seal members 117 and 119 may be ceramic material. A leaf spring 122 engages shoulders 118 and 121 to bias seal member 117 into sealing engagement with the surface 66 of casing 64 and the inside surface of plate 39 and the edge seal 122 in engagement with the inside of plate 41 respectively.

Seal assembly 94 has side seals 123 and 124 in the opposite sides thereof that are biased into engagement with the inside surface of plates 39 and 41 with leaf springs 126 and 127 respectively. As shown in FIG. 9, seals 123 and 124 have at their outer ends slots 128 and 129 that accommodate seal member 117 and edge seal 119 respectively. Side seals 123 and 124 may be ceramic material.

As shown in FIG. 7, a pair of semi-circular bar seals 131 and 132 are retained in piston 59 and engage opposite sides of the seal assembly body 94. The outer peripheral portion of piston 59 has a pair of side seal assemblies indicated generally at 133 and 136 that engage opposite sides of vane assembly 94. Side seal assembly 133 is located in a generally cylindrical slot 134 facing and open to slot 99. Side seal assembly 136 is located in a cylindrical slot 137 facing and open to opposite side of slot 99.

Figure 10:
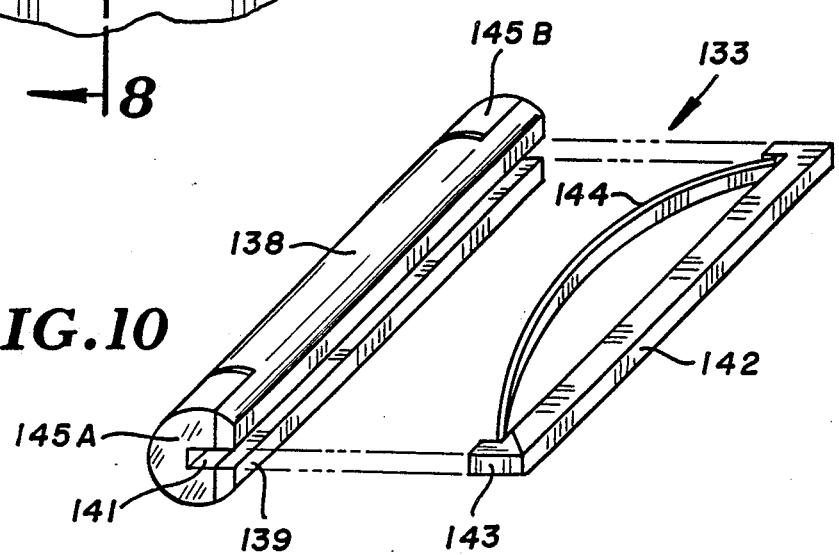
FIG. 10 is an exploded perspective view of a side seal of the seal assembly.

Referring to FIG. 10, there is shown the side seal assembly 133. Side seal assembly 136 has identical structure. Side seal assembly 133 has a body 138 having an outer arcuate surface that extends to a flat outer face 139. A longitudinal groove 141 is open to face 139 and accommodates a bar seal 142 and edge seal 143. A leaf spring 144 located in groove 141 engages bar seal 142 and edge seal 143 to bias them in an outward direction to maintain sealing engagement with the side of seal assembly 94. Semi-circular bearing members 145A and 145B are located in recesses in opposite ends of body 138. Members 145A and 145B have outer arcuate surfaces that are slightly larger than the outer arcuate surface of body 138 to allow limited angular movement of side seal assembly in piston 59.

As shown in FIG. 5, intake valve 146 and exhaust 147 are operatively associated with casing 64 to allow an air-fuel mixture to flow into the chamber 101 and exhaust gases to flow out of the chamber. An ignition unit 148, such as a sparkplug, is located in a recess 149 in casing 64 between intake valve 146 and exhaust valve 147. As shown in FIG. 4, an air inlet passage 150 draws air from the air filter chamber 37 to intake valve 146. Fuel is injected into the intake air with an electronic fuel injector 182 mounted on a housing ring 186. An example of fuel injector is shown in U.S. Pat. No. 4,033,507. Other types of fuel introducing systems can be used to provide the appropriate air-fuel mixture for the internal combustion engine. For example, a carburetor can be incorporated in inlet air passage 150. Propane gas can also be mixed with the air flowing to the internal combustion engine.

Casing 64 has an inlet valve chamber 151 accommodating a poppet valve 152. A rocker arm 153 pivotally supported on post 154 is operable to move poppet valve 152 to an open position. A valve spring 155 returns valve 152 to the closed position. As shown in FIG. 4, an exhaust pipe 156 is threaded into casing 64 and communicates with an exhaust valve chamber 157. An exhaust poppet valve 158 is movably mounted on casing 64 and is operable to selectively open and close the exhaust valve chamber 157 to allow exhaust gases to be discharged to the atmosphere. Muffler and catalytic converter structures can be connected to the exhaust pipe 156 and additional exhaust pipes 156A, 156B, 156C, and 156D of the engine. Poppet valve 158 is moved to open its position with a rocker arm pivotally mounted on a post 161. Valve 158 has a valve spring 162 that returns the valve to its closed position. As shown in FIG. 4, a pair of push rods 164 and 166 are operable to move rocker arms 153 and 159 in response to rotation of shaft 64. The lower ends of the push rods 164 and 166 engage cylindrical members or follows 167 and 168 that are movably mounted in a guide block 169 secured to plate 41. The inner ends of the cylindrical members ride on the outer surfaces of cams 171 and 172. Cams 171 and 172 are part of a sleeve that is rotatably mounted on shaft 46 with a bearing 173. Cams 171 and 172 each have three equally spaced lobes that sequentially engage the cylindrical members 167 and 168 on rotation of the cam sleeve. Gear train indicated generally at 174 operates to rotate cams 171 and 172 and thereby operate the rocker arms 153 and 159 to selectively open and close the valves 152 and 158. Gear train 174 comprises a drive gear 176 secured to shaft 46 adjacent wall 38. A driven gear 177 is secured to the cam sleeve and rotates cams 171 and 172. First and second gears 178 and 179 drivably connect drive gear 176 with driven gear 177. Gear 178 is large spur gear located in driving engagement with small drive gear 176. Gear 178 is secured to small second gear 179 which is in a spur gear that is in driving engagement with driven gear 177. Gear train 174 reduces the speed of the rotation of the cams 171 and 172 relative to shaft 46 at a ratio of 6 to 1. In other words, shaft 46 has a speed ratio of 6 to 1 relative to cams 171 and 172. Gears 178 and 179 are rotatable on bearing 180 which is supported on common axle 181 secured to plate 38. Axle 181 can be alternatively secured to block 169. Other types of power transmissions can be used to connect shaft 46 with cams 171 and 172 that selectively operate arms 153 and 159 and the rocker arms for the remaining valve assemblies of the internal combustion engine. For example, a planetary gear train can be used to connect shaft 46 with the cam sleeve to rotate the cams 171 and 172 in timed relation with the orbit movement of piston 59. A timing belt can transmit power from shaft 46 to cams 171 and 172.

Internal combustion engine 10 has intake and exhaust valves for each of the combustion chambers 102, 103, 104, and 105. The intake and exhaust valves have the same structure as the valves 146 and 147. Spark plugs 148A, 148B, 148C, and 148D are located between each of the intake and exhaust valves. The ignition wires 183 are connected to each of the spark plugs and a electrical timing device such as a distributor or electronic ignition system (not shown). Each of the valves 146 A-D and 147 A-D are operated with rocker arms. Push rods operatively connect the rocker arms to cams 171 and 172 which on rotation of the shaft 46 sequentially operate the valves between their open and closed positions.

In use, an external force, such as a starter motor, is used to rotate shaft 46. This causes piston 59 to have orbital motion in the amount determined by the distance between the axis of rotation of shaft 46 and the axis 62 of the eccentric 58. The secondary eccentrics 71 and 72 limit the angular movement of piston 59 causing the peripheral segments of the outer surface 67 of piston 59 to sequentially move toward and away from inner cylindrical wall 66 of casing 64. This results in changing of the volume of the combustion chambers 101-105.

Seal assemblies 91 and 95 are in substantially constant and uniform sealing engagement with the inner wall 66 of casing 64 thereby continuously separating the combustion chambers. Seal members 117 are maintaied in sliding frictional contact with wall 66 and have limited arcuate movement relative thereto during orbit motion of piston 59. Each seal assembly is anchored to housing end plates 39 and 41 through the cooperating means of arcuate slots 111 and 112 and the ends of cross 107 and rollers 108 and 109 thereon located in the slots. This ensures the constant and uniform sealing engagement of seal members 117 with inner wall 66 of casing 64. All of the seal assembles are located in circumferential spaced generally radial slots in piston 59 so that the piston moves relative to the seal assemblies. This minimizes the centrifugal force on the seal assemblies thereby reducing the variations in the sealing loads on the blades. The seal assemblies have low sliding speeds and low sealing friction. This improves the compression and combustion efficiency as well as the wear life of the seal assemblies. The rotation of shaft 46 through the gear train 174 rotates cams 171 and 172. This causes a sequential opening and closing of the intake and exhaust valves in a timed relationship with the rotation of piston 59. On the opening of the intake valve, a fuel and air mixture flows into the combustion chamber. The intake valve then closes when the piston 59 is moved toward the cylindrical wall 66 of casing 64 associated with the intake valve. This compresses the air and fuel mixture in the combustion chamber. When the outer surface 67 of piston 59 approaches the inner surface 66 of casing 64, the spark plug 148 is energized to provide a spark which ignites the air-fuel mixture in the combustion chamber. The burning air-fuel mixture in the combustion establishes a force on piston 59 causes the piston to have orbit motion thereby rotate shaft 46. On the completion of the burning of fuel in the combustion chamber, the exhaust valve 147 is opened so that the exhaust gases in combustion chamber are forced through exhaust gas chamber 157 and exhaust pipe 156 to atmosphere on the movement of piston 59 toward the inner wall 66 of casing 64 forming combustion chambr 101. This combustion process is repeated for each of the combustion chambers 102, 103, 104 and 105 thereby provide for sequential and continuous rotational force on the shaft 46. The engine 20 can have one or more combustion chambers with intake and exhaust valves and ignition units associated with each chamber.

While there is shown and described one embodiment of the internal combustion engine of the invention and the seal assemblies, and intake and exhaust valves, it is understood that changes in the structure and arrangement of structure can be made by those skilled in the art without departing from the invention. The invention is defined in the following claims.

The embodiments of the invention in which an exclusive property or privilege is claimed are defined as follows:

1. An orbit internal combustion engine comprising: housing means having a body with a cylindrical inner wall surrounding a plurality of combustion chambers, means for providing a combustible air and fuel mixture to each combustion chamber, a plurality of pairs of intake and exhaust valve means mounted on the body for controlling the flow of said air and fuel mixture into and out of said combustion chambers, said pairs of intake and exhaust valve means being located around the body with one pair of intake and exhaust valve means in communication with each combustion chamber, shaft means rotatably mounted on the housing means, a piston surrounded by said housing means, said piston having surfaces in each combustion chamber and movable in a compression stroke and an expansion stroke relative to each combustion chamber, a first eccentric member secured to the shaft means, means mounting the piston on the first eccentric member, a second eccentric member rotatably mounted on the housing means, means mounting the piston on the second eccentric member, a third eccentric member rotatably mounted on the housing means, means mounting the piston on the third eccentric member, said second and third eccentric members being spaced from each other and radially spaced from the first eccentric member whereby the first eccentric member causes the piston to move about an axis offset from the axis of rotation of the shaft means, said second and third eccentric members limiting the amount of angular movement of the piston as the piston moves within the combustion chambers in its compression stroke and expansion stroke, means for operating said intake and exhaust valves in timed relation with the rotation of the shaft to allow said air and fuel mixture to flow into the combustion chambers and allow exhaust gases to flow out of the combustion chamber, a plurality of seal assemblies mounted on the piston, said seal assemblies being arranged around said piston to provide separate arcuate combustion chambers and located a seal assembly between each pair of intake and exhaust valve means, said piston having circumferentially spaced slots for each seal assembly whereby the piston moves relative to each seal assembly during movement of the piston, each seal assembly having a seal means located in sealing engagement with said cylindrical inner wall, each of said seal assemblies and housing means having cooperating means for allowing limited arcuate movement of the seal assembly and restrict radial movement thereof during movement of the piston, and fuel ignition means mounted on the housing means in communication with each combustion chamber operable to ignite the fuel in said combustion chambers to thereby cause the piston to have orbit movement and rotate the shaft.

2. The engine of claim 1 wherein: the piston has an outer cylindrical surface surrounded by the cylindrical inner wall of the body, said piston having a diameter smaller than the diameter of the cylindrical inside wall.

3. The engine of claim 1 including: counterweight means mounted on the piston to balance said piston during movement thereof.

4. The engine of claim 3 wherein: said piston has a bore spaced from opposite sides of the second and third eccentrics, said counterweight means comprising a member located within said bore.

5. The engine of claim 1 wherein: each of seal assemblies has a blade, said blade having side surfaces and an outer end, said outer end having a groove, a seal member located in said groove engageable with said inner wall, cross rod means attached to said blade, said housing means having arcuate slots with radii having substantially the same radius as the radius of the cylindrical inner wall of the housing means aligned with the cross bar means, said cross rod means having ends projected into said arcuate slots to allow the blade to have limited arcuate movement and restrict radial movement thereof.

6. The engine of claim 5 including: side seal means mounted on the piston engageable with opposite sides of the blades.

7. The engine of claim 1 wherein: said body has side walls located adjacent opposite sides of the piston, said cooperating means comprising arcuate transversely aligned slots in said side walls open to opposite sides of the piston and spaced radially inward of said cylindrical inner wall, each of said slots having a radius that is substantially the same as the radius of the cylindrical inner wall, each seal means having projections extented into said aligned slots in the side walls to restrict radial movement of the seal assembly and maintain the seal means in substantially constant and uniform sealing engagement with said cylindrical inner wall during movement of the piston in said combustion chambers.

8. The engine of claim 7 wherein: each of seal means has a blade, said blade having side surfaces and an outer end, said outer end having a groove, a seal member located in said groove engageable with said cylindrical inner wall of the body, means to bias the seal member into engagement with said cylindrical inner wall of the body, said projections comprising opposite ends of cross bar means attached to said blade.

9. An orbit internal combustion engine comprising: housing means having a cylindrical inner wall surrounding a plurality of combustion chambers, means for providing combustible fuel to each of said combustion chambers, valve means for controlling the flow of said combustible fuel and exhaust gases into and out of said combustion chambers, a piston surrounded by said cylindrical inner wall, said piston having surfaces in each combustion chamber and movable in a compression stroke and an expansion stroke relative to each combustion chamber within said chamber, shaft means including first eccentric means rotatably mounted on the housing means, said piston being rotatably mounted on the first eccentric means whereby angular movement of the first eccentric means moves the piston within said combustion chambers, second eccentric means rotatably mounted on the housing means, said piston being movably associated with said second eccentric means to limit angular movement thereof during its movement in the combustion chambers, means for operating said valve means in timed relation with the rotation of the shaft to allow said combustible fuel to flow into the combustion chambers and allow exhaust gases to flow out of the combustion chambers, a plurality of seal assemblies movably mounted on said piston, said seal assemblies being located in sealing engagement with said cylindrical inner wall of the housing means and arranged around said piston to provide separate arcuate combustion chambers, each seal assembly having blade means extended between the piston and housing means, said piston having general radial movement relative to each seal assembly, each seal assembly and housing means having cooperating means for allowing limited arcuate movement of the seal assembly and restrict radial movement thereof during movement of the piston whereby said moving piston draws the combustible fuel into said combustion chambers and exhaust gases from said combustion chambers, said cooperating means comprising arcuate slots in said housing means open to the piston and spaced radially inward of said cylindrical inner wall, each of said slots having a radius that is substantially the same as the radius of the cylindrical inner wall, each blade means having projection means extended into the arcuate slots to restrict radial movement of the blade means and maintain the seal assemblies in sealing engagement with said cylindrical inner wall of the housing means during movement of the piston in the chamber, and fuel ignition means mounted on the housing means in communication with each combustion chamber operable to ignite the fuel in said combustion chambers to thereby cause the piston to have orbit movement and rotate the shaft.

10. The engine of claim 9 including: seal members on the outer ends of the blade means engageable with said inner wall of the housing means.

11. The engine of claim 9 wherein: said piston has radial slots accommodating said seal assemblies.

12. The engine of claim 9 wherein: each blade means has a groove in the outer end thereof, a seal member located in said groove continuously engageable with said inner wall of the body, and means biasing the seal member into engagement with said inner wall.

13. The engine of claim 12 wherein: said piston has radial slots accommodating said blade means.

14. The engine of claim 9 wherein: said projection means comprise rod means secured to the blade means, said rod means having roller ends located in said slots.

15. The engine of claim 9 wherein: said second eccentric means comprises a pair of eccentric members rotatably mounted on the housing means, each of said eccentric members being movably associated with said piston.

16. The engine of claim 15 wherein: said pair of eccentric members are circumferentially spaced from each other and radially spaced from the first accentric means.

17. An orbit internal combustion engine comprising housing means having an inner wall surrounding at least one combustion chamber, means for providing combustible fuel to said combustion chamber, valve means for controlling the flow of said combustible fuel into and exhaust gases out of said combustion chamber, piston means surrounded by said cylindrical inner wall, said piston means having a surface in said combustion chamber and movable in a compression stroke and an expansion stroke relative to said combustion chamber, a shaft having first eccentric means rotatably mounted on the housing means, second eccentric means radially spaced outward from the first eccentric means rotatably mounted on the housing means, said piston means being rotatably mounted on the first and second eccentric means whereby movement of the piston means rotates the shaft, means for operating said valve means in timed relation with the rotation of the shaft to allow said combustible fuel to flow into the combustion chamber and allow exhaust gases to flow out of the combustion chamber, a plurality of seal assemblies movably mounted on said piston means, said seal assemblies being located in sealing engagement with said inner wall of the housing means and arranged around said piston-means to provide said combustion chambers, each seal assembly having blade means extended between the piston means and housing means, said piston means having generally radial movement relative to each seal assembly, a plurality of arcuate slots in said housing means open to the piston means and spaced radially inward of said inner wall, each blade means having projection means extended into the aligned arcuate slots to restrict movement of the blade means and maintain the seal assembly in sealing engagement with said inner wall of the housing means during movement of the piston means in the chamber whereby said moving piston means draws said combustible fuel into said combustion chamber and exhausts the exhaust gases from said combustion chamber, and fuel ignition means mounted on the housing means in communication with said combustion chamber operable to ignite the fuel in said combustion chamber to thereby cause the piston to have orbit movement and rotate the shaft.

18. The engine of claim 17 including: seal members on the outer ends of the blade means engageable with said inner wall of the housing means, and biasing means for biasing the seal members into engagement with said inner wall.

19. The engine of claim 17 wherein: said piston means has radial slots accommodating said seal assemblies.

20. The engine of claim 17 wherein: each blade means has a groove in the outer end thereof, a seal member located in said groove continuously engageable with said inner wall of the housing means, and means biasing the seal member into engagement with said inner wall.

21. The engine of claim 17 wherein: said second eccentric means includes a plurality of eccentric members rotatably mounted on the housing means, each of said eccentric members being movably associated with said piston means, circumferentially spaced from each other, and radially spaced from the inner wall of the housing means.

22. The engine of claim 17 wherein: the housing means has a generally cylindrical inner wall, and each slot has a radius that is substantially the same as the radius of the innerwall of the housing means.

* * * * *